United States Patent
Furukawa

(10) Patent No.: US 9,401,571 B2
(45) Date of Patent: Jul. 26, 2016

(54) COAXIAL CONNECTOR AND CAMERA MODULE HAVING THE SAME

(71) Applicant: YAZAKI CORPORATION, Tokyo (JP)

(72) Inventor: Shouichi Furukawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/671,155

(22) Filed: Mar. 27, 2015

(65) Prior Publication Data

US 2015/0280373 A1  Oct. 1, 2015

(30) Foreign Application Priority Data

Mar. 28, 2014  (JP) ................. 2014-069088

(51) Int. Cl.
| | |
|---|---|
| *H01R 13/46* | (2006.01) |
| *H01R 13/52* | (2006.01) |
| *H01R 24/40* | (2011.01) |
| *H01R 24/44* | (2011.01) |
| *H04N 5/225* | (2006.01) |
| *H01R 103/00* | (2006.01) |

(52) U.S. Cl.
CPC ............... *H01R 24/40* (2013.01); *H01R 13/46* (2013.01); *H01R 13/5202* (2013.01); *H01R 24/44* (2013.01); *H04N 5/2252* (2013.01); *H04N 5/2257* (2013.01); *H01R 2103/00* (2013.01)

(58) Field of Classification Search
CPC ........ H01R 24/40; H01R 24/50; H01R 13/46; H01R 2103/00; H01R 12/57
USPC ....................................... 439/578
See application file for complete search history.

(56) References Cited

U.S. PATENT DOCUMENTS

| | | | | | |
|---|---|---|---|---|---|
| 3,975,077 | A  * | 8/1976 | Peterson | .............. | H01R 13/052 439/675 |
| 4,952,173 | A  * | 8/1990 | Peronnet | ................ | H01R 24/48 439/583 |
| 6,558,177 | B2 * | 5/2003 | Havener | ................ | H01R 24/50 439/246 |
| 7,479,033 | B1 * | 1/2009 | Sykes | .................. | H01R 9/0518 439/578 |
| 7,952,035 | B2 * | 5/2011 | Falk | .................... | H01R 13/5216 174/650 |
| 2013/0102187 | A1 * | 4/2013 | Camelio | ................ | H01R 24/50 439/578 |
| 2014/0017928 | A1 * | 1/2014 | Shah | .................. | H01R 13/6277 439/350 |
| 2014/0322970 | A1 * | 10/2014 | Binder | ................. | H01R 13/629 439/578 |

FOREIGN PATENT DOCUMENTS

JP       2007-035587 A     2/2007

* cited by examiner

*Primary Examiner* — Amy Cohen Johnson
*Assistant Examiner* — Oscar C Jimenez
(74) *Attorney, Agent, or Firm* — Sughrue Mion, PLLC

(57) ABSTRACT

A coaxial connector includes: an inner conductive terminal; an outer conductive terminal in which the inner conductive terminal is accommodated; and a connector housing that holds the inner conductive terminal and the outer conductive terminal in a state in which the inner conductive terminal is accommodated in the outer conductive terminal. The connector housing includes a first housing part having a first dielectric constant and a second housing part which has a second dielectric constant different from the first dielectric constant and is formed so as to fill a gap between the inner conductive terminal and the outer conductive terminal with at least a portion of the second housing part, and the second housing part is disposed at a position in which impedance between the inner conductive terminal and the outer conductive terminal approaches a predetermined value.

7 Claims, 15 Drawing Sheets

COAXIAL CONNECTOR AND CAMERA MODULE HAVING THE SAME

CROSS REFERENCE TO RELATED APPLICATION

This application is based on Japanese Patent Application (No. 2014-069088) filed on Mar. 28, 2014, the contents of which are incorporated herein by reference. Also, all the references cited herein are incorporated as a whole.

BACKGROUND OF THE INVENTION

1. Technical Field

Embodiments of the present invention relate to a coaxial connector and a camera module having the same.

2. Background Art

As a coaxial connector which is connected to a plug for a coaxial cable, there is a coaxial connector which has a shield and a contact, in which a terminal part of the contact is disposed in a cylindrical part of the shield, and a gap between the cylindrical part and the terminal part is filled with an insulating material (for example, refer to Patent Document 1).

Patent Document 1 is JP-A-2007-35587.

SUMMARY OF THE INVENTION

Meanwhile, it is necessary to reduce a diameter of the cylindrical part of the shield in order to miniaturize the coaxial connector.

However, if the diameter of the cylindrical part is reduced, a distance to the terminal part of the contact is shortened, and thus impedance becomes less than a target value range. In other words, it is hard to miniaturize the coaxial connector in a state in which the cylindrical part of the shield is reduced while the impedance falls within the target value range.

The present invention has been made in consideration of the above-described circumstances, and one of objects of the present invention is to provide a coaxial connector which can achieve miniaturization thereof while impedance falls within a target value range, and a camera module having the coaxial connector.

In order to achieve the above-described object, a coaxial connector according to embodiments of the present invention has features of the following (1) to (5).

(1) A coaxial connector including:
an inner conductive terminal;
an outer conductive terminal in which the inner conductive terminal is accommodated; and
a connector housing that holds the inner conductive terminal and the outer conductive terminal in a state in which the inner conductive terminal is accommodated in the outer conductive terminal, wherein
the connector housing includes a first housing part having a first dielectric constant and a second housing part which has a second dielectric constant different from the first dielectric constant and is formed so as to fill a gap between the inner conductive terminal and the outer conductive terminal with at least a portion of the second housing part, and
the second housing part is disposed at a position in which impedance between the inner conductive terminal and the outer conductive terminal approaches a predetermined value.

(2) The coaxial connector according to (1), wherein
a front end of the inner conductive terminal and a front end of the outer conductive terminal which are electrically connected to a counterpart connector protrude from a front end of the connector housing,
a rear end of the inner conductive terminal and a rear end of the outer conductive terminal which are electrically connected to a circuit board protrude from a rear end of the connector housing, and
the second housing part is located between the inner conductive terminal and the outer conductive terminal at the rear end of the connector housing, and is in close contact with the inner conductive terminal and the outer conductive terminal.

(3) The coaxial connector according to (1), wherein
the inner conductive terminal is rod-shaped,
the outer conductive terminal is cylindrical, and accommodates the inner conductive terminal therein, and
the second housing part is located at a rear end of the connector housing and between the inner conductive terminal and the outer conductive terminal, and is in close contact with an outer surface of the inner conductive terminal and a cylindrical inner surface of the outer conductive terminal and a cylindrical outer surface of the outer conductive terminal.

(4) The coaxial connector according to (1), wherein
the outer conductive terminal has a first cylindrical part located at a front end side of the outer conductive terminal and a second cylindrical part located at a rear end side of the outer conductive terminal, and an opening of the first cylindrical part is larger than an opening of the second cylindrical part, and
the second housing part is located inside the second cylindrical part and between the inner conductive terminal and the second cylindrical part.

(5) The coaxial connector according to (4), further including an annular elastic member, wherein
a groove is formed on an outer surface of the first housing part so as to surround the second cylindrical part, and
the annular elastic member is accommodated in the groove.

In the coaxial connector having the configuration of (1), the connector housing is configured to include the first housing part having the first dielectric constant, and the second housing part which is formed so as to fill a portion of the first housing part with a resin having the second dielectric constant different from the first dielectric constant, and the second housing part is disposed at a position in which the impedance between the inner conductive terminal and the outer conductive terminal approaches a predetermined value.

In other words, even in a situation in which the outer conductive terminal is reduced so that a distance between the inner conductive terminal and the outer conductive terminal is shortened, and thus it is hard to secure a sufficient dielectric property between the inner conductive terminal and the outer conductive terminal, the second housing part for adjusting a dielectric constant is disposed between the inner conductive terminal and the outer conductive terminal. Consequently, the impedance between the inner conductive terminal and the outer conductive terminal can fall within a target value range. Therefore, it is possible to reduce a size of the outer conductive terminal while maintaining the impedance of the coaxial connector within a target value range and to miniaturize the coaxial connector.

In addition, the second housing part is formed so as to fill a portion of the first housing part, and thus it is possible to easily form the second housing part.

In the coaxial connector of the present embodiments, the counterpart connector is connected to the front end side of the connector housing. A shape of the front end of the connector housing is determined depending on a shape of the counterpart connector, and thus design flexibility thereof is limited. Thus, in order to miniaturize the coaxial connector, miniaturizing the rear end side of the connector housing can be considered. In the coaxial connector having the configuration of (2), if the second housing part is provided at the rear end of the connector housing, the second housing part can be easily formed, for example, by providing a recess at the rear end of the first housing part and filling the recess with the second housing part. As mentioned above, this configuration in which the second housing part is provided at the rear end of the connector housing is preferable in a case where the rear end side of the connector housing is miniaturized, since impedance matching can be achieved simply by filling the rear end of the first housing part with the second housing part when the rear end side of the outer conductive terminal is miniaturized.

In addition, in the coaxial connector having the configuration of (2), the second housing part is formed so as to fill a gap between the inner conductive terminal and the outer conductive terminal at the rear end of the connector housing, and thus a gap between the inner conductive terminal and the outer conductive terminal which are exposed from the rear end of the connector housing is embedded in the second housing part. For this reason, it is possible to prevent water from permeating into the gap between the inner conductive terminal and the outer conductive terminal at the rear end of the connector housing.

In addition, in the coaxial connector having the configuration of (3), the second housing part is formed so as to fill the gap between the inner conductive terminal and the outer conductive terminal and the outside of the outer conductive terminal at the rear end of the connector housing, and thus the root portions of the inner conductive terminal and the outer conductive terminal which are exposed from the rear end of the connector housing are enclosed with the second housing part. For this reason, it is possible to prevent water from permeating into the gap between the inner conductive terminal and the outer conductive terminal and the outside of the outer conductive terminal along at the rear end of the connector housing.

In the coaxial connector having the configuration of (4), the outer conductive terminal is constituted by the first cylindrical part located at the front end side and the second cylindrical part located at the rear end side, and an opening of the second cylindrical part is smaller than an opening of the first cylindrical part. As mentioned above, even in the outer conductive terminal which can be miniaturized, the second housing part is provided inside the second cylindrical part where impedance mismatch may occur, and thus the impedance of the inside of the second cylindrical part can be adjusted to fall within a target value range.

In the coaxial connector having the configuration of (5), the O-ring is attached to the groove and is made to be in close contact with a cover or the like, and thus it is possible to obtain a waterproofing property. Meanwhile, if the groove is formed on the outer surface of the connector housing at the outer circumferential position of the second cylindrical part of the outer conductive terminal, a resin corresponding to a volume of the groove is removed, and thus a dielectric property deteriorates. For this reason, the impedance mismatch further occurs inside the second cylindrical part. However, even in this case, the second housing part is provided inside the second cylindrical part, and thus the impedance of the inside of the second housing part can be adjusted to fall within the target value range.

In addition, in order to achieve the above-described object, a camera module according to the embodiments of the present invention has a feature of the following (6).

(6) A camera module including the above-described coaxial connector.

In the camera module having the configuration of (6), it is possible to achieve miniaturization and weight reduction of the camera module while maintaining favorable performance.

According to the embodiments of the present invention, it is possible to provide a coaxial connector which can achieve miniaturization thereof while maintaining impedance within a target value range, and a camera module having the coaxial connector.

As mentioned above, the present invention has been described briefly. In addition, embodiments to be described below will be read through with reference to the accompanying drawings, and details of the present invention will become more apparent.

DETAILED DESCRIPTION OF THE EXEMPLARY EMBODIMENTS

Hereinafter, embodiments of a coaxial connector and a camera module having the coaxial connector according to the present invention will be described with reference to the drawings.

[First Embodiment]

Figure 1:
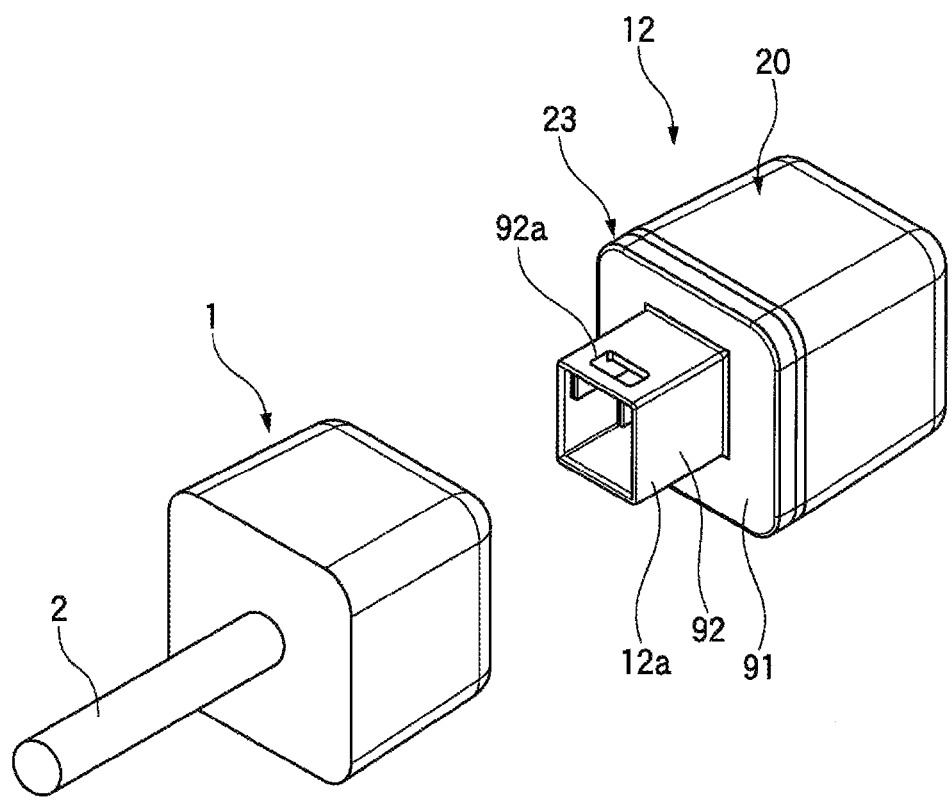
FIG. 1 is a perspective view of a camera module according to a first embodiment and a counterpart connector.
Figure 2:
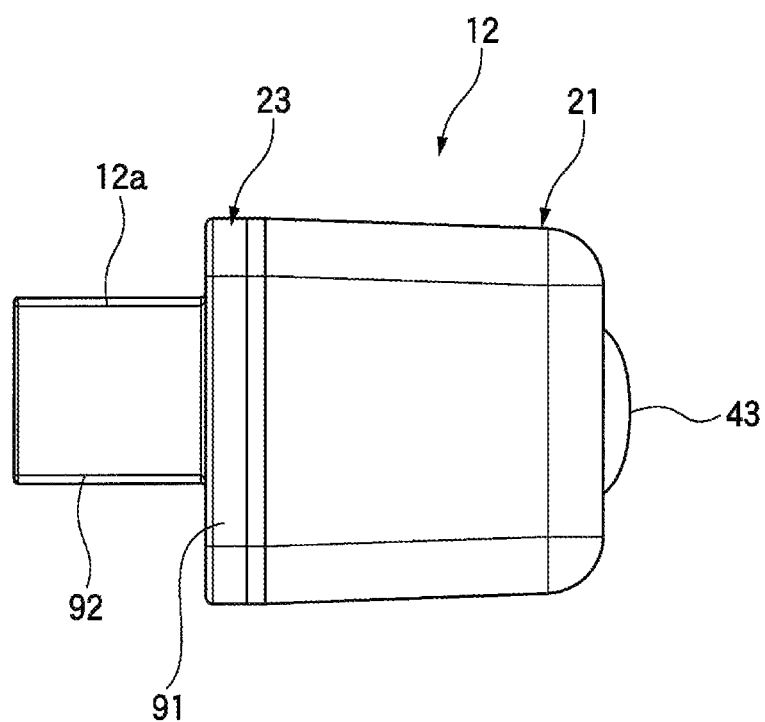
FIG. 2 is a side view of the camera module according to the first embodiment.

FIG. 1 is a perspective view of a camera module and a counterpart connector according to the present embodiment. FIG. 2 is a side view of the camera module according to the present embodiment.

As illustrated in FIGS. 1 and 2, a camera module 12 according to the present embodiment has a connection part 12a, and the connection part 12a is connected to a counterpart connector 1. The counterpart connector 1 has a coaxial electric wire 2 which extends from a control apparatus (not illustrated) or the like, and signals are transmitted and received between the control apparatus and the camera module 12 via the coaxial electric wire 2.

Figure 3:
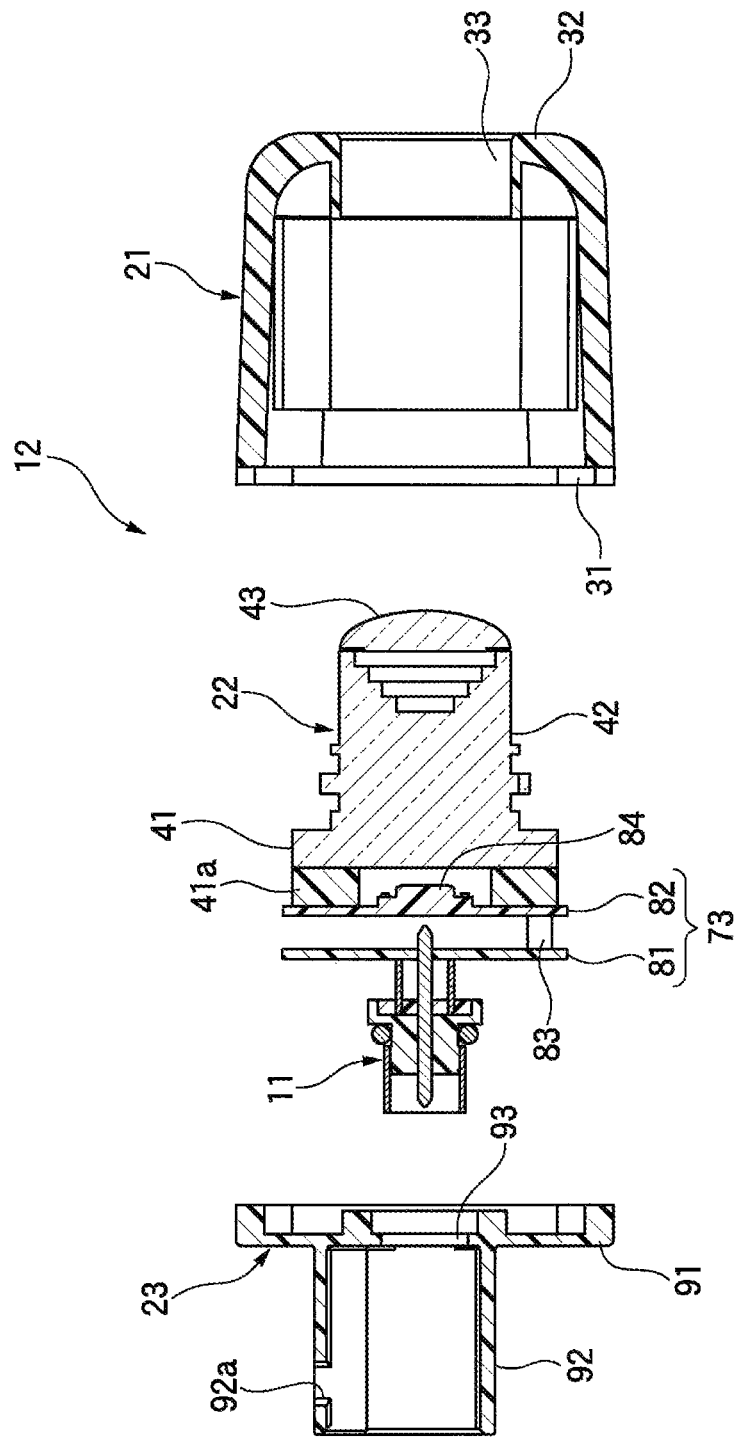
FIG. 3 is a cross-sectional view of the exploded camera module according to the first embodiment.
Figure 4:
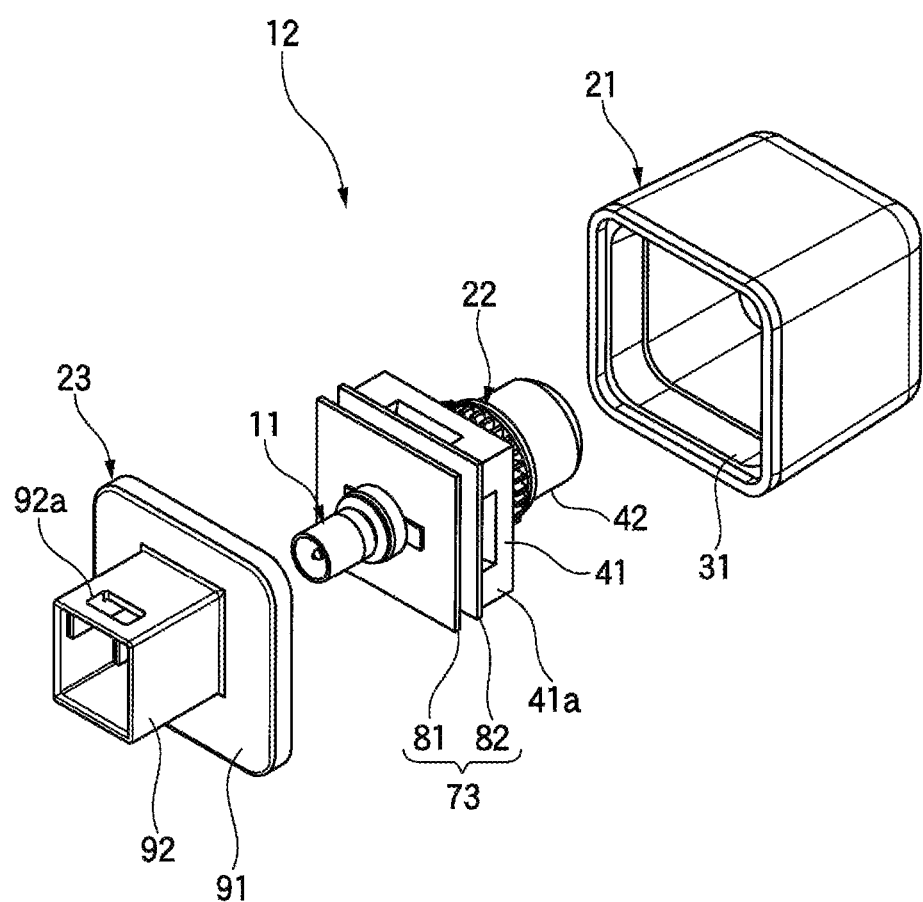
FIG. 4 is an exploded perspective view of the camera module according to the first embodiment.
Figure 5:
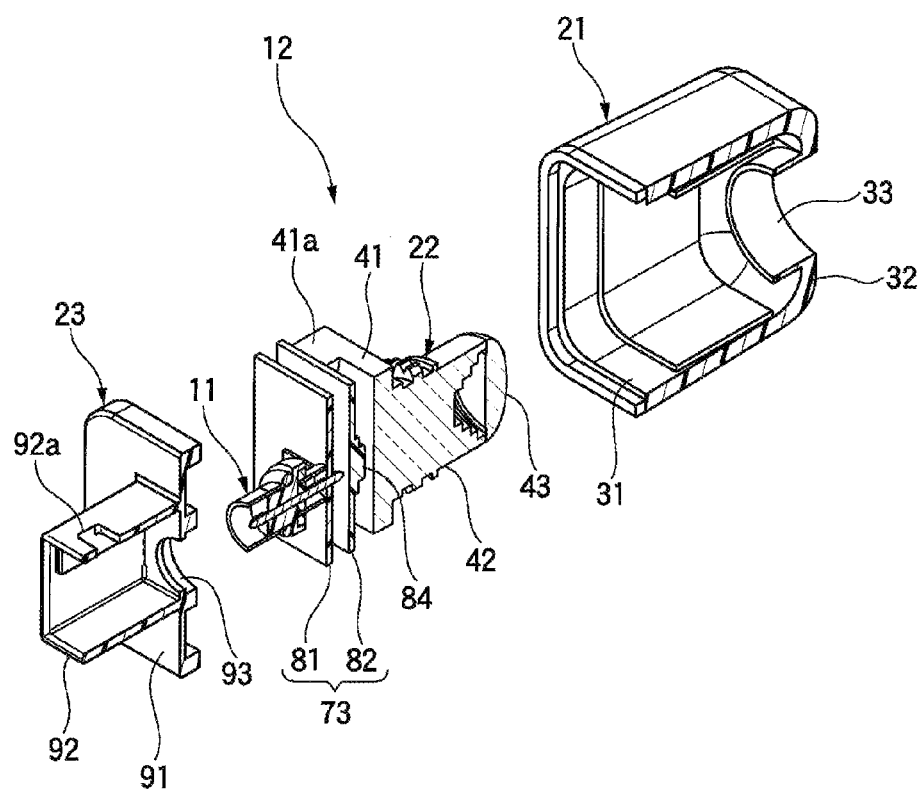
FIG. 5 is an exploded perspective view of the camera module according to the first embodiment in a cross-sectional view.

FIG. 3 is a cross-sectional view of the exploded camera module according to the present embodiment. FIG. 4 is an exploded perspective view of the camera module according to the present embodiment. FIG. 5 is an exploded perspective view of the camera module according to the present embodiment in a cross-sectional view.

As illustrated in FIGS. 3 to 5, the camera module 12 has a coaxial connector 11 according to the present embodiment. The camera module 12 has a case 21, a lens unit 22, and a cover 23, and the coaxial connector 11 is accommodated in the case 21.

The case 21 is made of a synthetic resin, and is formed in a box shape of which one end is open. In the case 21, a fitting hole part 33 is formed at a bottom 32 on an opposite side to an opening part 31. The lens unit 22 is incorporated into the case 21 from the opening part 31 side of the case 21.

The lens unit 22 has a tabular base 41, and an optical mechanism part 42 which protrudes from a central part of one surface of the base 41. A camera lens 43 which is circular in a front view is provided at a front end of the optical mechanism part 42. In the base 41, protrusions 41a are formed at four corners on an opposite side to the optical mechanism part 42.

The lens unit 22 is fitted into the case 21 through the opening part 31 side so as to be attached to the case 21. In addition, the lens unit 22 is incorporated into the case 21, and thus a front end portion of the optical mechanism part 42 is fitted to the fitting hole part 33 of the case 21 and the camera lens 43 is exposed from the fitting hole part 33.

The coaxial connector 11 is mounted on a circuit board 73. The circuit board 73 includes a first board 81 and a second board 82. The first board 81 and the second board 82 are connected to each other via a connection member 83, and are disposed with a gap therebetween. The coaxial connector 11 is soldered so as to be fixed to the first board 81. In the second board 82, an imaging element 84 such as a charge coupled device (CCD) image sensor is mounted at a central part on a surface opposite to the first board 81.

The coaxial connector 11 mounted on the circuit board 73 is accommodated in the case 21 so that the circuit board 73 is directed toward the case 21. Consequently, the imaging element 84 of the second board 82 of the circuit board 73 is disposed on an optical axis of the camera lens 43 of the lens unit 22. At this time, the protrusions 41a formed at the base 41 of the lens unit 22 come into contact with the second board 82, and a gap is formed between the base 41 and the second board 82. Consequently, the imaging element 84 is disposed on optical axes of the lens unit 22 and the camera lens 43 without interference to the base 41.

The cover 23 is made of a synthetic resin, and has a tabular part 91, and a connection cylindrical part 92 which is formed at a central part of the tabular part 91 on an opposite surface to the case 21. The tabular part 91 has an insertion hole 93 at its central part, and the insertion hole 93 communicates with the connection cylindrical part 92. The connection cylindrical part 92 has a locking hole 92a which is formed at its side surface and can be locked with a locking part (not illustrated) provided in the counterpart connector 1.

The cover 23 is attached from the opening part 31 side of the case 21. Consequently, the opening part 31 of the case 21 is closed by the tabular part 91 of the cover 23. In addition, when the cover 23 is attached to the case 21, the coaxial connector 11 accommodated in the case 21 is inserted into the insertion hole 93 of the tabular part 91 so as to be disposed inside the connection cylindrical part 92. Further, in the camera module 12, the connection part 12a connected to the counterpart connector 1 is constituted by the connection cylindrical part 92 and the coaxial connector 11.

Figure 6:
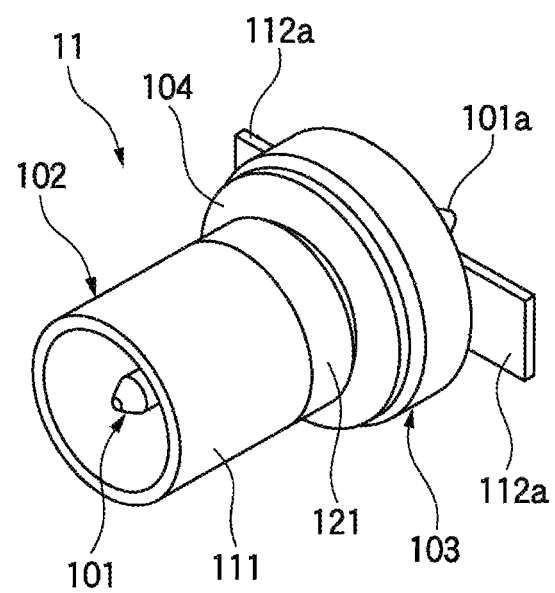
FIG. 6 is a perspective view of a coaxial connector according to the first embodiment viewed from a front side.
Figure 7:
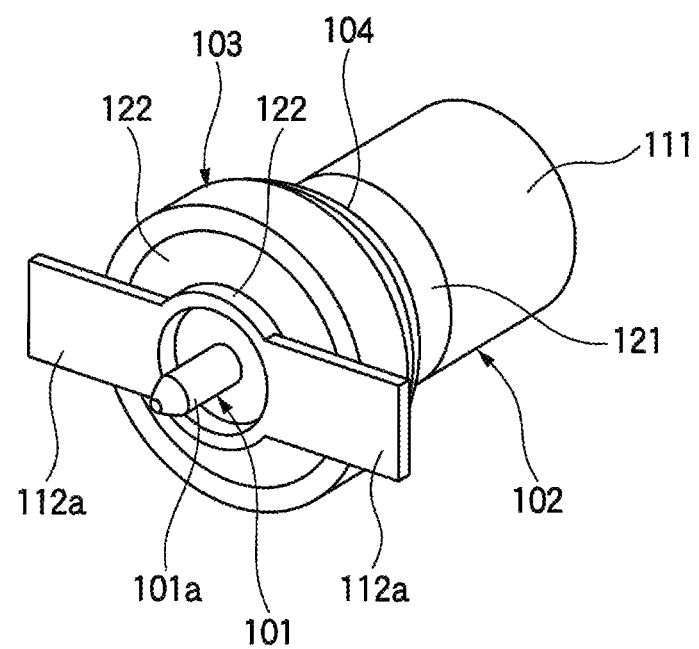
FIG. 7 is a perspective view of the coaxial connector according to the first embodiment viewed from a rear side.
Figure 8:
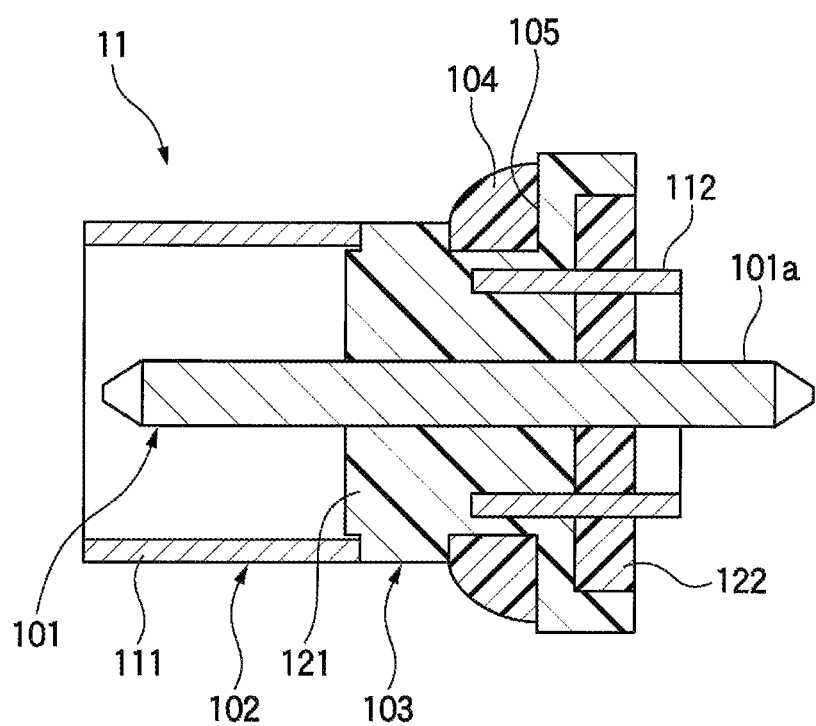
FIG. 8 is a cross-sectional view of the coaxial connector according to the first embodiment.
Figure 9:
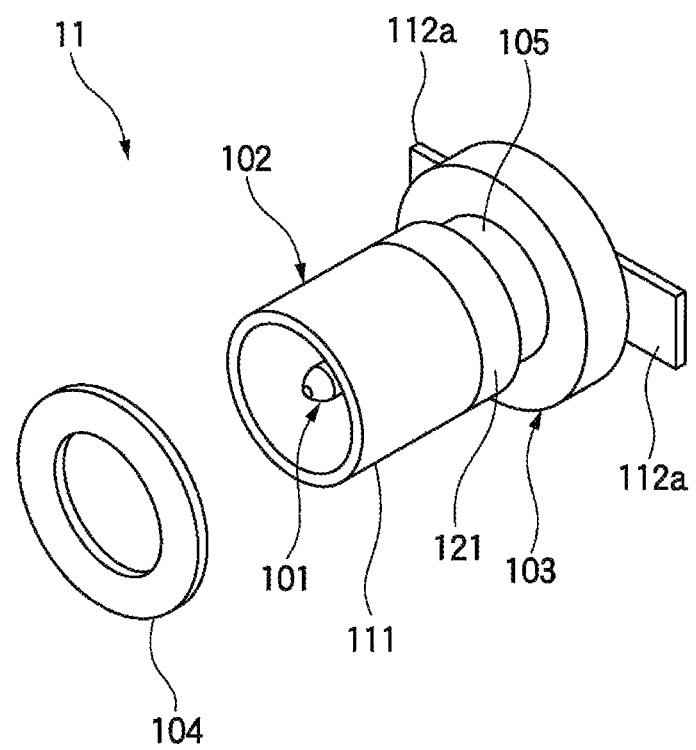
FIG. 9 is a perspective view of the coaxial connector according to the first embodiment from which an O-ring is removed.
Figure 10:
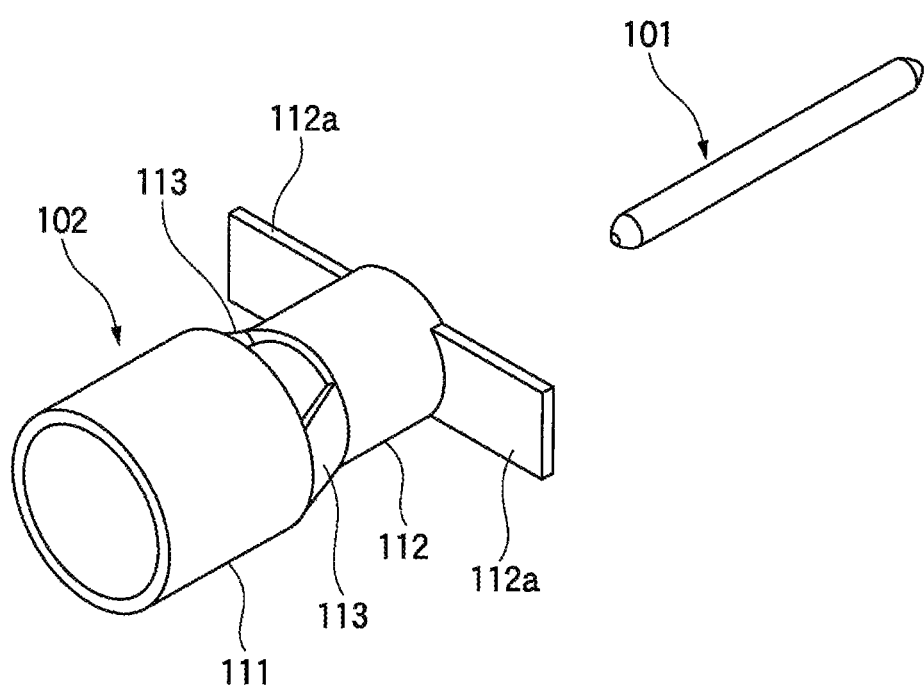
FIG. 10 is a perspective view of an inner conductive terminal and an outer conductive terminal.

FIG. 6 is a perspective view of the coaxial connector according to the present embodiment viewed from a front side. FIG. 7 is a perspective view of the coaxial connector according to the present embodiment viewed from a rear side. FIG. 8 is a cross-sectional view of the coaxial connector according to the present embodiment. FIG. 9 is a perspective view of the coaxial connector according to the present embodiment from which an O-ring is removed. FIG. 10 is a perspective view of an inner conductive terminal and an outer conductive terminal.

As illustrated in FIGS. 6 to 8, the coaxial connector includes an inner conductive terminal 101, an outer conductive terminal 102, and a connector housing 103. As illustrated in FIG. 9, the coaxial connector 11 has an O-ring 104. The O-ring 104 is made of an elastic material such as rubber, and is mounted in a state being positioned at and attached to a groove 105 formed at a first housing part 121, which will be described later, of the connector housing 103.

As illustrated in FIG. 10, the inner conductive terminal 101 is formed to be rod-shaped. The outer conductive terminal 102 is formed to be cylindrical, and accommodates the inner conductive terminal 101 therein. The inner conductive terminal 101 and the outer conductive terminal 102 are made of a conductive metal material such as copper or a copper alloy.

As illustrated in FIG. 10, the outer conductive terminal 102 has a first cylindrical part 111 and a second cylindrical part 112. The first cylindrical part 111 is located at a front end side of the outer conductive terminal 102, and the second cylindrical part 112 is located at a rear end side of the outer conductive terminal 102. An opening of the first cylindrical part 111 is larger than an opening of the second cylindrical part 112. Central axial lines of the first cylindrical part 111 and the second cylindrical part 112 are the same as each other, and the inner conductive terminal 101 is disposed on the central axial lines. The first cylindrical part 111 and the second cylindrical part 112 are disposed with a gap therebetween in an axial direction. Ends facing each other in the first cylindrical part 111 and the second cylindrical part 112 are connected to each other via a connection part 113. In the second cylindrical part 112, an outer conductive terminal piece 112a is formed at an end on an opposite side to the first cylindrical part 111. The outer conductive terminal piece 112a extends from the second cylindrical part 112 outwardly in a diameter direction.

As illustrated in FIGS. 9 and 10, the connector housing 103 is made of a resin, and the outer conductive terminal 102 is formed in the connector housing 103 in an inserted state. The inner conductive terminal 101 is inserted into the connector housing 103 which holds the outer conductive terminal 102, and thus the inner conductive terminal 101 is held in the connector housing 103. In the above-described way, the connector housing 103 holds the inner conductive terminal 101 and the outer conductive terminal 102 in a state in which the inner conductive terminal 101 is accommodated in the outer conductive terminal 102. The peripheries of the connection part 113 and the second cylindrical part 112 of the outer conductive terminal 102 are covered by the connector housing 103. As illustrated in FIGS. 6 and 8, the front end of the inner conductive terminal 101 and the front end of the first cylindrical part 111 located at the front end of the outer conductive terminal 102 protrude on the front end side of the connector housing 103, and the exposed parts constitute the connection part 12a connected to the counterpart connector 1. In addition, as illustrated in FIGS. 7 and 8, portions of the second cylindrical part 112 located at the rear end of the inner conductive terminal 101 and at the rear end of the outer conductive terminal 102 protrude on the rear end side of the connector housing 103. The rear end of the inner conductive terminal 101 protruding from the connector housing 103 constitutes an inner conductive terminal part 101a. Further, a procedure of assembling the inner conductive terminal 101 and the outer conductive terminal 102 to the connector housing 103 is not limited to the above-described procedure. Both the inner conductive terminal 101 and the outer conductive terminal 102 may be formed in the connector housing 103 in an inserted state so that the inner conductive terminal 101 and the outer conductive terminal 102 are assembled to the connector housing 103. Alternatively, the connector housing 103 may be formed in advance, and the inner conductive terminal 101 and the outer conductive terminal 102 may be inserted into the connector housing 103 so that the inner conductive terminal 101 and the outer conductive terminal 102 are assembled to the connector housing 103.

The connector housing 103 has the first housing part 121 and a second housing part 122. The groove 105 which positions and accommodates the O-ring 104 is bored so as to surround the second cylindrical part 112 on the outer surface of the first housing part 121 as illustrated in FIG. 8. The second housing part 122 is located at the rear end of the first housing part 121. The second housing part 122 is provided so as to fill a central side at the rear end of the first housing part 121 in a state of being embedded, and an outer circumferential side of the second housing part 122 is covered by the first housing part 121. The inner conductive terminal 101 and the second cylindrical part 112 of the outer conductive terminal 102 penetrate through the second housing part 122. In other words, one portion of the second housing part 122 is located between the inner conductive terminal 101 and the outer conductive terminal 102, that is, inside the second cylindrical part 112. In addition, the other portion of the second housing part 122 is located outside the outer conductive terminal 102, that is, outside the second cylindrical part 112.

The first housing part 121 has a first dielectric constant $\in 1$, and the second housing part 122 has a second dielectric constant $\in 2$. As mentioned above, the second housing part 122 has the second dielectric constant $\in 2$ which is different from the first dielectric constant $\in 1$, and is formed so as to fill a gap between the inner conductive terminal 101 and the outer conductive terminal 102 with at least a portion thereof. The second dielectric constant $\in 2$ of a resin forming the second housing part 122 is adjusted to be smaller or greater than the first dielectric constant $\in 1$ of a resin forming the first housing part 121 in order to avoid impedance mismatch between the inner conductive terminal 101 and the outer conductive terminal 102.

The inner conductive terminal part 101a of the inner conductive terminal 101 is inserted into a through hole (not illustrated) formed in the first board 81 and is soldered, and the outer conductive terminal piece 112a of the outer conductive terminal 102 is soldered to a conductive pattern of the first board 81, so that the coaxial connector 11 is fixed to the first board 81 of the circuit board 73.

As mentioned above, the coaxial connector 11 fixed to the circuit board 73 is accommodated in the case 21 to which the lens unit 22 is attached, from the opening part 31 side, with respect to the case 21 to which the lens unit 22 is attached, and the imaging element 84 of the second board 82 is disposed on the optical axis of the lens unit 22. In addition, the cover 23 is assembled to the case 21 to which the coaxial connector 11 is attached, so as to close the opening part 31 of the case 21. When the cover 23 is assembled to the case 21, the coaxial connector 11 is inserted into the insertion hole 93 of the cover 23. Consequently, the coaxial connector 11 is disposed in the connection cylindrical part 92 of the cover 23, and thus the connection part 12a is constituted by the connection cylindrical part 92 and the coaxial connector 11. Further, when the cover 23 is assembled to the case 21, the tabular part 91 of the cover 23 is pressed by the O-ring 104 accommodated in the groove 105 of the coaxial connector 11. Consequently, the O-ring 104 comes into close contact with the tabular part 91, and thus water or dust is prevented from permeating into the case 21 through the insertion hole 93.

In the coaxial connector 11 according to the present embodiment, the outer conductive terminal 102 is constituted by the first cylindrical part 111 located at the front end side and the second cylindrical part 112 located at the rear end side, and the opening of the second cylindrical part 112 is smaller than the opening of the first cylindrical part 111, thereby achieving miniaturization. Consequently, it is possible to miniaturize the camera module 12 in which the coaxial connector 11 is accommodated in the case 21.

Figure 11:
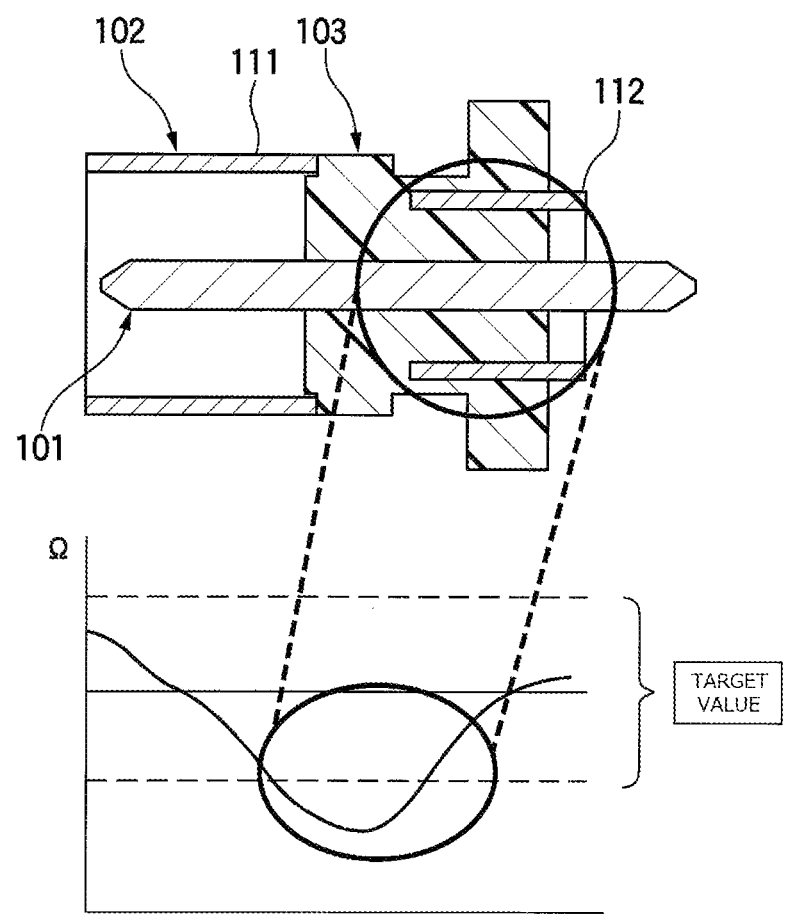
FIG. 11 is a diagram illustrating an impedance characteristic of a coaxial connector related to a reference example.

Meanwhile, as illustrated in FIG. 11, in a case where the connector housing 103 is made of a single kind of resin, if the coaxial connector 11 is intended to be miniaturized by reducing a diameter of the outer conductive terminal 102, a distance to the inner conductive terminal 101 is shortened, and thus it is hard to secure a sufficient dielectric property between the inner conductive terminal and the outer conductive terminal. As a result, the impedance of the coaxial connector 11 becomes less than a target value range. On the other hand, if the impedance of the coaxial connector 11 is intended to fall within the target value range, a distance between the inner conductive terminal and the outer conductive terminal is needed to a certain extent in order to secure a sufficient dielectric property between the inner conductive terminal and the outer conductive terminal, thus a size of the outer conductive terminal 102 increases, and, as a result, it is hard to miniaturize the coaxial connector 11.

Therefore, in the coaxial connector 11 according to the present embodiment, the connector housing 103 is configured to include the first housing part 121 having the first dielectric constant $\in 1$, and the second housing part 122 which has the second dielectric constant $\in 2$ different from the first dielectric constant $\in 1$ and is formed so as to fill a gap between the inner conductive terminal 101 and the outer conductive terminal 102 with at least a portion thereof. In addition, the second housing part 122 is disposed at a position in which the impedance between the inner conductive terminal 101 and the outer conductive terminal 102 approaches a predetermined value. In other words, dielectric of a location whose impedance is smaller than a target value is appropriately adjusted by using the second housing part 122.

Figure 12:
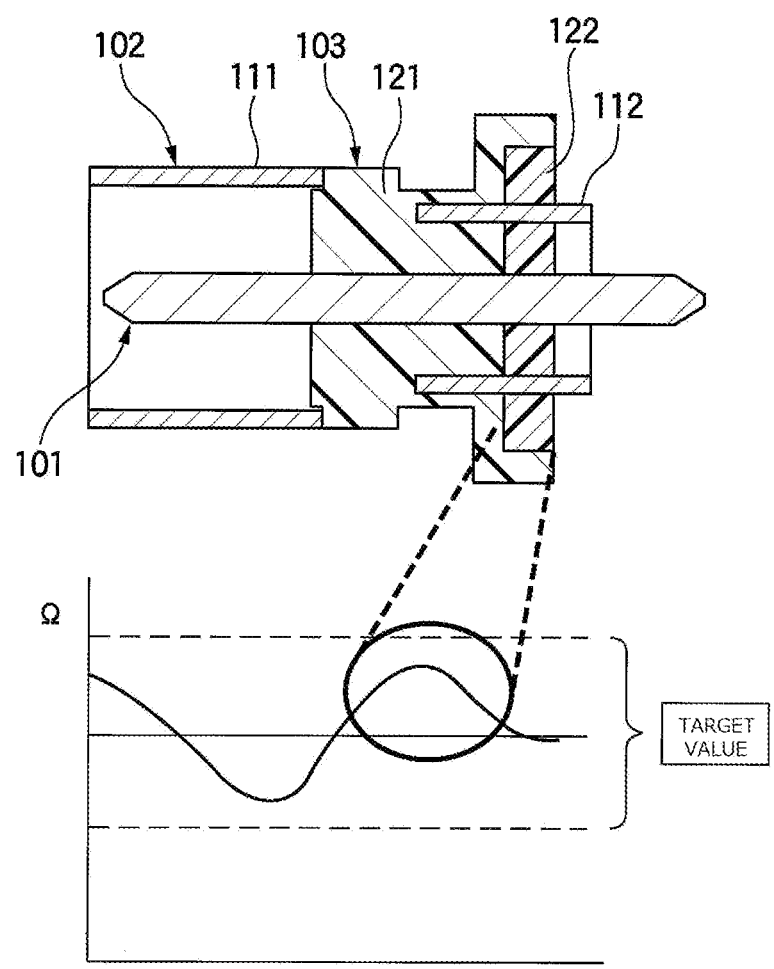
FIG. 12 is a diagram illustrating an impedance characteristic of the coaxial connector according to the first embodiment.

Specifically, as illustrated in FIG. 12, the second housing part 122 is provided inside the second cylindrical part 112 in which the impedance may be reduced due to a distance between the inner conductive terminal and the outer conductive terminal being shortened. For this reason, the impedance of the inside of the second cylindrical part 112 can be adjusted within a target value range.

As a result, even if a size of the outer conductive terminal 102 is reduced, the impedance of the coaxial connector 11 can fall within the target value range. Therefore, it is possible to reduce a size of the outer conductive terminal 102 while maintaining the impedance of the coaxial connector 11 within a target value range and to miniaturize the coaxial connector 11. Thus, it is possible to achieve miniaturization and weight reduction of the camera module 12 having the coaxial connector 11 while maintaining favorable performance.

In addition, the second housing part 122 is formed so as to fill a portion of the first housing part 121, and thus it is possible to easily form the second housing part 122.

Particularly, if the second housing part 122 is provided at the rear end of the connector housing 103, the second housing part 122 can be easily formed, for example, by providing a recess at the rear end of the first housing part 121 and filling the recess with the second housing part 122. Meanwhile, a shape of the front end of the connector housing 103 is determined depending on a shape of the counterpart connector, and thus design flexibility thereof is limited. Thus, in order to miniaturize the coaxial connector, miniaturizing the rear end side of the connector housing 103 can be considered. In these circumstances, there is considerable significance to adjust the impedance mismatch of the rear of the outer conductive terminal 102 due to the miniaturization by providing the second housing part 122 at the rear end of the connector housing 103.

In addition, the second housing part 122 is formed so as to fill the rear end of the connector housing 103 from which the rear end of the inner conductive terminal 101 and the rear end of the outer conductive terminal 102 protrude, and root portions of the inner conductive terminal 101 and the outer conductive terminal 102 which are exposed from the rear end of the connector housing 103 can be enclosed with the second housing part 122. For this reason, it is possible to prevent water from permeating through the inner conductive terminal 101 and the outer conductive terminal 102 at the rear end of the connector housing 103.

In addition, in the coaxial connector 11, the groove 105 to which the O-ring 104 is attached is formed on the outer surface of the connector housing 103 at the outer circumferential position of the second cylindrical part 112 of the outer conductive terminal 102. Therefore, the O-ring 104 is attached to the groove 105 and is made to be in close contact with the cover 23, and thus it is possible to obtain a waterproofing property.

Meanwhile, if the groove 105 is formed on the outer surface of the connector housing 103 at the outer circumferential position of the second cylindrical part 112 of the outer conductive terminal 102, a resin corresponding to a volume of the groove is removed, and thus dielectric deteriorates. For this reason, the impedance is further reduced inside the second cylindrical part 112. However, even in this case, the second housing part 122 is provided inside the second cylindrical part 112, and thus the impedance of the inside of the second housing part 122 can be adjusted to fall within the target value range.

In addition, in the embodiment of the present invention, a description has been made of the configuration in which the second housing part is disposed at a location where a reduction in impedance occurs. On the contrary to this configuration, the second housing part may be disposed at a location where impedance increases. Also with the above configuration, the impedance can be adjusted to fall within the target value range.

Further, in the embodiment of the present invention, a description has been made of the configuration in which the second housing part 122 is provided at the rear end of the connector housing 103. As long as at least a portion of the second housing part 122 is disposed between the inner conductive terminal and the outer conductive terminal, the effect of the present invention can be achieved. For this reason, a location where the second housing part 122 is provided is not limited to the rear end of the connector housing 103. A location where the second housing part 122 is provided may be the front end or the side surface of the connector housing 103.

[Second Embodiment]

Figure 13:
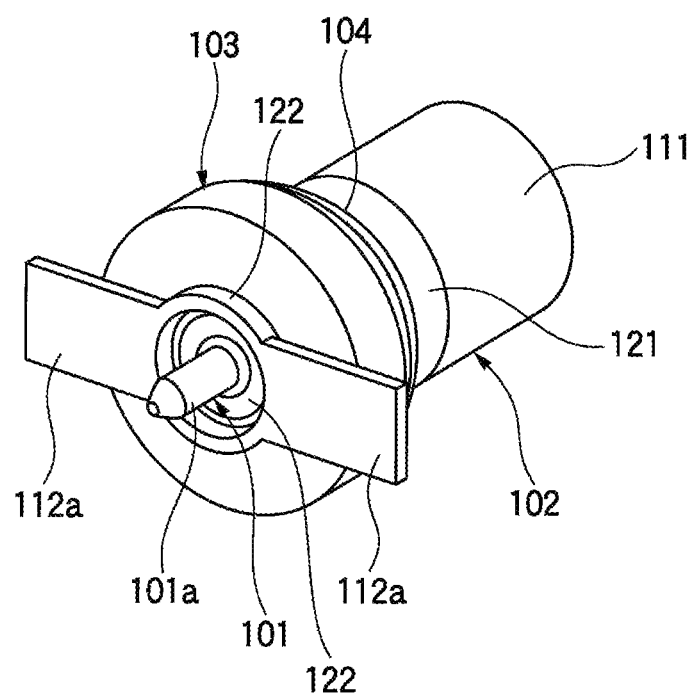
FIG. 13 is a perspective view of a coaxial connector according to a second embodiment viewed from a rear side.
Figure 14:
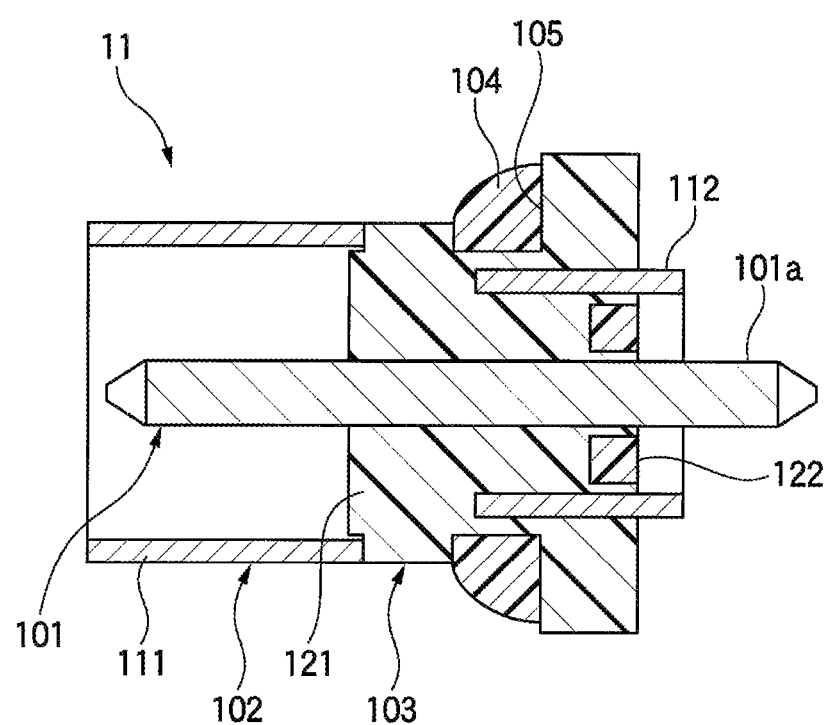
FIG. 14 is a cross-sectional view of the coaxial connector according to the second embodiment.

FIG. 13 is a perspective view of a coaxial connector according to a second embodiment viewed from a rear side. FIG. 14 is a cross-sectional view of the coaxial connector according to the second embodiment. The coaxial connector according to the second embodiment is different from that of the first embodiment in terms of shapes of the first housing part 121 and the second housing part 122. The remaining members are the same as those described in the first embodiment, and thus description thereof will be omitted.

As illustrated in FIGS. 13 and 14, the second housing part 122 of the second embodiment is provided between the inner conductive terminal 101 and the outer conductive terminal 102, that is, inside the second cylindrical part 112. Also in this form, it is possible to appropriately adjust dielectric at a location in which impedance is smaller or greater than a target value by using the second housing part 122.

In addition, the root portions of the inner conductive terminal 101 and the outer conductive terminal 102 which are exposed from the rear end of the connector housing 103 are enclosed with the first housing part 121. For this reason, it is possible to prevent water from permeating through and along the inner conductive terminal 101 and the outer conductive terminal 102 at the rear end of the connector housing 103.

[Third Embodiment]

Figure 15:
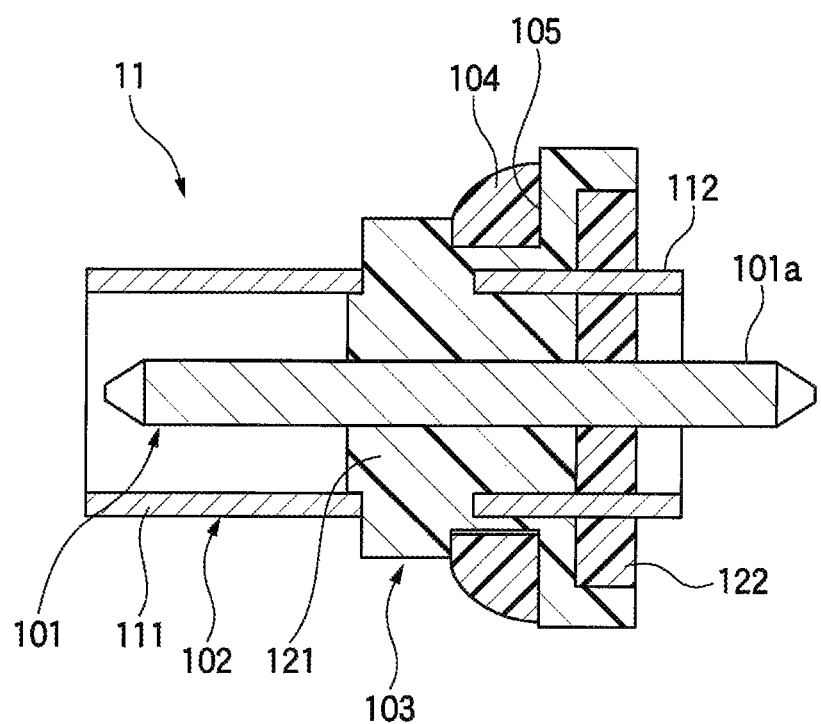
FIG. 15 is a cross-sectional view of a coaxial connector according to a third embodiment.

FIG. 15 is a cross-sectional view of a coaxial connector according to a third embodiment. The coaxial connector according to the third embodiment is different from that of the first embodiment in terms of the shape of the outer conductive terminal 102. The remaining members are the same as those described in the first embodiment, and thus description thereof will be omitted.

As illustrated in FIG. 15, the first cylindrical part 111 and the second cylindrical part 112 of the outer conductive terminal 102 have the same opening size. In the first embodiment, a description has been made of a case where the opening of the first cylindrical part 111 is larger than the opening of the second cylindrical part 112, but, in the coaxial connector of the present invention, a size of the opening of the first cylindrical part 111 may be the same as a size of the opening of the second cylindrical part 112. Also in this form, it is possible to appropriately adjust dielectric of a location whose impedance is smaller or greater than a target value by using the second housing part 122.

Further, the present invention is not limited to the above-described embodiments, and may have modifications, alterations, and the like as is appropriate. Still further, a material, a shape, a dimension, the number, an arrangement location, and the like of each constituent element in the above-described embodiments are arbitrary and are not limited as long as the present invention can be achieved.

Here, the features of the embodiments of the coaxial connector and the camera module having the same according to the above-described present invention are collectively stated briefly in the following [1] to [5].

[1] A coaxial connector including:

an inner conductive terminal (101);

an outer conductive terminal (102) in which the inner conductive terminal is accommodated; and a connector housing (103) that holds the inner conductive terminal and the outer conductive terminal in a state in which the inner conductive terminal is accommodated in the outer conductive terminal, wherein the connector housing includes a first housing part (121) having a first dielectric constant ($\in 1$) and a second housing part (122) which has a second dielectric constant (∈2) different from the first dielectric constant and is formed so as to fill a gap between the inner conductive terminal and the outer conductive terminal with at least a portion of the second housing part, and the second housing part is disposed at a position which causes impedance to approach a predetermined value between the inner conductive terminal and the outer conductive terminal.

[2] The coaxial connector according to [1], wherein
a front end of the inner conductive terminal and a front end of the outer conductive terminal which are electrically connected to a counterpart connector (1) protrude from a front end of the connector housing, and a rear end of the inner conductive terminal and a rear end of the outer conductive terminal which are electrically connected to a circuit board (73) protrude from a rear end of the connector housing, and the second housing part is located between the inner conductive terminal and the outer conductive terminal at the rear end of the connector housing, and is in close contact with the inner conductive terminal and the outer conductive terminal.

[3] The coaxial connector according to [1], wherein
the inner conductive terminal is rod-shaped,
the outer conductive terminal is cylindrical, and accommodates the inner conductive terminal therein, and
the second housing part is located at a rear end of the connector housing and between the inner conductive terminal and the outer conductive terminal, and is in close contact with an outer surface of the inner conductive terminal and a cylindrical inner surface of the outer conductive terminal and a cylindrical outer surface of the outer conductive terminal.

[4] The coaxial connector according to [1], wherein
the outer conductive terminal has a first cylindrical part (111) located at the front end side of the outer conductive terminal and a second cylindrical part (112) located at the rear end side of the outer conductive terminal, and an opening of the first cylindrical part is larger than an opening of the second cylindrical part, and the second housing part is located inside the second cylindrical part and between the inner conductive terminal and the second cylindrical part.

[5] The coaxial connector according to [4], further including an annular elastic member (O-ring 104), wherein
a groove (105) is formed on an outer surface of the first housing part so as to surround the second cylindrical part, and
the annular elastic member is accommodated in the groove.

[6] A camera module including the coaxial connector according to [1].

What is claimed is:

1. A coaxial connector comprising:
an inner conductive terminal;
an outer conductive terminal in which the inner conductive terminal is accommodated; and
a connector housing that holds the inner conductive terminal and the outer conductive terminal in a state in which the inner conductive terminal is accommodated in the outer conductive terminal, wherein
the connector housing includes:
a first housing part having a first dielectric constant, and
a second housing part which has a second dielectric constant different from the first dielectric constant and is formed so as to fill a gap extending from the inner conductive terminal to the outer conductive terminal with at least a portion of the second housing part, the second housing part is disposed at a position in which impedance between the inner conductive terminal and the outer conductive terminal approaches a predetermined value, the outer conductive terminal has a cylindrical shape, and
the at least portion of the second housing part is located within a space defined and enclosed by the cylindrical shape of the outer conductive terminal wherein the inner conductive terminal is rod-shaped, the outer conductive terminal is cylindrical, and accommodates the inner conductive terminal therein, and the second housing part is located at a rear end of the connector housing and between the inner conductive terminal and the outer conductive terminal, and is in direct contact with each of an outer surface of the inner conductive terminal, a cylindrical inner surface of the outer conductive terminal, and a cylindrical outer surface of the outer conductive terminal.

2. The coaxial connector according to claim 1, wherein
a front end of the inner conductive terminal and a front end of the outer conductive terminal which are electrically connected to a counterpart connector protrude from a front end of the connector housing,
a rear end of the inner conductive terminal and a rear end of the outer conductive terminal which are electrically connected to a circuit board protrude from a rear end of the connector housing, and
the second housing part is located between the inner conductive terminal and the outer conductive terminal at the rear end of the connector housing, and is in direct contact with the inner conductive terminal and the outer conductive terminal.

3. The coaxial connector according to claim 1, wherein
the outer conductive terminal has a first cylindrical part located at a front end side of the outer conductive terminal and a second cylindrical part located at a rear end side of the outer conductive terminal, and an opening of the first cylindrical part is larger than an opening of the second cylindrical part, and
the second housing part is located within a space defined and enclosed by the second cylindrical part and between the inner conductive terminal and the second cylindrical part.

4. The coaxial connector according to claim 3, further comprising an annular elastic member, wherein
a groove is formed on an outer surface of the first housing part so as to surround the second cylindrical part, and
the annular elastic member is accommodated in the groove.

5. The coaxial connector according to claim 3, wherein the second cylinder part protrudes from a rear end of the second housing part.

6. A camera module comprising the coaxial connector according to claim 1.

7. The coaxial connector according to claim 1, wherein the connector housing is integrally formed.

* * * * *